2,843,527
PRODUCTION OF GRISEOFULVIN IN LOW NITROGEN LEVEL MEDIUM

Alan Rhodes, Bracknell, and Rodger Crosse, Slough, England, and Thomas Primrose Ferguson, Salisbury, Southern Rhodesia, assignors to Glaxo Laboratories Limited, Greenford, England No Drawing. Application March 26, 1956
Serial No. 573,621
Claims priority, application Great Britain March 28, 1955
21 Claims. (Cl. 195—81)

The present invention is concerned with improvements in or relating to antibiotics, and in particular relates to a process for the production of griseofulvin under deep culture conditions.

Griseofulvin is a known antibiotic, which has been shown to possess important antifungal properties. Its structure was first established by Grove et al. (Chem. and Ind., March 17, 1951, page 219) and the following structure was assigned by them to the antibiotic:

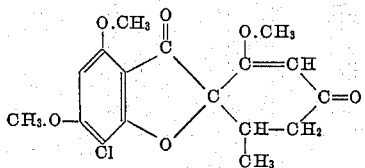

The production and isolation of griseofulvin on a large scale has hitherto proved difficult. Thus from the literature (see Oxford et al., J. Biochem. XXXIII (2), 240 (1939); Brian et al., Trans. Brit. Mycol. Soc. 29, 173 (1946); Grove et al., Nature 160, 574 (1947); Grove et al. (loc. cit.); and MacMillan, Chem. and Ind., August 25, 1951, p. 719) it appears that griseofulvin has been produced in surface cultures only from at least three species of mould namely P. griseofulvin, P. janczewskii and P. patulum.

The antibiotic griseofulvin possesses valuable antifungal properties, and inter alia is very suitable for use as an antifungal agent, particularly in agriculture for use for example in fruit and other sprays or as a seed dressing. The use of an antibiotic, particularly on a large scale, such as for agricultural purposes, requires that it can be cheaply produced in large quantities. The methods of producing griseofulvin hitherto proposed have all involved the surface culture of various moulds, a technique which is by no means suited to large scale production.

We have however now found that it is possible to obtain griseofulvin on a large scale, and more conveniently than hitherto, by culturing suitable organisms under submerged aerobic culture conditions, and by paying careful attention to various factors governing the culture.

As is known, various species of the genus Penicillium produce griseofulvin in differing quantities when grown on suitable media. It is difficult to specify exactly which species are suitable for the production of griseofulvin by submerged fermentation, and indeed there is considerable variation amongst strains of a particular species. Perhaps the simplest method of determining which strains may be used for satisfactory deep fermentation is by carrying out trial fermentations, according to the method of this invention, and selecting such strains as produce a reasonable level of the antibiotic. The antibiotic is found mainly in the mycelium, and in determining the amount produced reference is made to the amount of the antibiotic contained in the whole broth. In general, a griseofulvin producing organism should be used in the fermentation which produces, under deep culture conditions, at least 150 micrograms ($\mu$g). of griseofulvin per ml. of broth, it being understood that the culture is carried out under the conditions specified herein, and for a period until mycelial break-down just commences. A strain which produces at least 200 micrograms ($\mu$g.) per ml. should desirably be used, and we prefer to use a strain producing at least 500 micrograms ($\mu$g.) per ml.

One strain that we have found to be particularly suitable for the process according to the invention is that known as Penicillium patulum Bainier Thom (4640, 455) C. M. I. 39, 809 [NRRL (989) as P. urticae Bain (A)— G. Smith 1949]. This strain and mutants thereof is at present preferred since it has been found to give a high yield of griseofulvin under different submerged culture conditions. Moreover, this strain and mutants thereof has shown no substantial tendency to produce dechloro-griseofulvin when grown under the conditions specified herein, even applying tests sensitive to one microgram/ml. As is known, the dechloro compound has markedly less antifungal activity than griseofulvin itself, and is of little value.

Other strains which have been tested and which have been found more or less suitable are the following:

Asymmetrica-fasciculata (P. urticae series):
  Penicillium patulum C. M. I. 28, 808 Bainier Coll-Thom (4640-454). NCTC (1722) 1932— NRRL 994, ATCC 9260
  Penicillium urticae Bain (Rg8g)
  (P. griseofulvum) C. B. S. Baarn Asymmetrica-divaricata (P. nigricans series):
  Penicillium nigricans (Bain) (Zaleski). C. B. S. Baarn
  Penicillium janczewskii Zal. C. M. I. 29, 100. (Soil, Lakenheath Warren, Suffolk 1947—J. H. Warcup B25)
  Penicillium albidum Sopp. C. M. I. 40, 219
  Penicillium raciborskii Zal. C. M. I. 40, 568 (?T)
  Penicillium melinii Thom. C. M. I. 40, 216

It has been found that in order to achieve the relatively high yields of griseofulvin which are afforded by the present invention under deep culture conditions, the fermentation should take place under certain either essential or preferable conditions.

In general terms, the media to be used in the process according to this invention should include a source of nitrogen, a source of carbon and energy, and nutrient salts. Purely synthetic media (wherein, for example, the nitrogen is present as sodium nitrate) may be used; however, we prefer to use media wherein the nitrogen is provided by complex organic materials, since—as is known—such materials frequently have the advantage of supplying growth factors often desirable to support good growth of micro-organisms. Suitable complex nitrogenous materials include, for example, corn steep liquor (C. S. L.), milk products such as whey powder, buttermilk, liquid whey, cottonseed meal, oatmeal and soya bean meal etc. The choice of these materials will depend largely on availability and cost, but is also influenced by other factors in the fermentation technique employed, for example ease of control of pH. The final choice must depend on the balance of advantage in any given circumstances. Good results can also be obtained by the use of two or more different nitrogen sources together, as for example a mixture of corn steep liquor and whey powder or liquid whey.

The source of carbon and energy is preferably a carbohydrate such as lactose, glucose, sucrose or starch. For economy, these may preferably be supplied in impure forms as waste products from other processes, for example in the form of milk products media, molasses, or sulphite waste liquor. Fats may be used for this purpose, but carbohydrates are preferable. As with the nitrogen source, the final choice will depend on the balance of advantage in any given circumstances.

The nutrient salts which should be present particularly include phosphates. A source of chloride ions and magnesium ions is also preferable, especially if the other nutrients used are deficient in available chlorine and magnesium.

We have found that the most fundamentally important factor in successfully carrying out the invention is to control the level of available nitrogen in the medium. Although it has been found possible to produce griseofulvin within a wide range of available nitrogen levels in the medium, we have found that this level markedly influences the yield of griseofulvin, and for commercially satisfactory yields must be carefully controlled at rather lower levels than might be expected.

According to this invention therefore we provide a process for the production of griseofulvin under submerged aerobic conditions which includes the step of culturing a griseofulvin-producing organism in a culture medium which will support the growth of said organism for the production of griseofulvin, said medium including an assimilable source of nitrogen at a level of 0.04% to 0.30% of N, a source of carbon and energy, and nutrient salts.

For optimum results we find that the available nitrogen level is preferably between about 0.075% and 0.25%. We find that the optimum nitrogen level shows some variation with type of inoculum and type of fermenter. For example, in 250 ml. shake flasks the nitrogen level of the medium is optimal around 0.2% when a spore suspension is used as inoculum, but around 0.1–0.15% when a 5% vegetative inoculum is employed. In 150-gal. fermenters we have obtained very satisfactory yields of griseofulvin with a nitrogen level of 0.2% in the medium and a vegetative inoculum. This variation of the optimum nitrogen level can be seen from the following table.

TABLE A

| Treatments | | | 7 days | | 8 days | | 9 days | | 10 days | | 11 days | |
|---|---|---|---|---|---|---|---|---|---|---|---|---|
| Inocula | Carbohydrate | Nitrogen Level, percent | pH | Assay | pH | Assay | pH | Assay | pH | Assay | pH | Assay |
| Veg. Inoc. | Lactose | 0.24 | 6.43 | 593 | 6.29 | 973 | 6.61 | 1,080 | 7.07 | 1,455 | 6.89 | 1,230 |
| | do | 0.17 | 6.40 | 664 | 6.20 | 902 | 6.45 | 952 | 6.71 | 1,173 | 6.65 | 1,318 |
| | do | 0.10 | 6.45 | 840 | 6.31 | 1,730 | 6.37 | 1,564 | 6.68 | 1,292 | 6.55 | 2,625 |
| | Glucose | 0.24 | 7.20 | 656 | 7.21 | 700 | 7.72 | 772 | 7.66 | 772 | 7.83 | 872 |
| | do | 0.17 | 7.20 | 532 | 7.20 | 810 | 7.51 | 861 | 7.66 | 933 | 7.68 | 1,108 |
| | do | 0.10 | 6.24 | 930 | 6.39 | 1,220 | 6.88 | 726 | 7.06 | 884 | 6.83 | 1,176 |
| | Sucrose | 0.24 | 6.85 | 641 | 7.62 | 620 | 8.03 | 536 | 8.25 | 582 | | |
| | do | 0.17 | 7.36 | 541 | 7.63 | 618 | 7.71 | 678 | 7.95 | 700 | 7.78 | 804 |
| | do | 0.10 | 6.57 | 1,070 | 6.51 | 1,162 | 6.87 | 842 | 7.13 | 933 | 7.32 | 836 |
| | Starch | 0.24 | 8.18 | 517 | 7.86 | 532 | 7.94 | 535 | 8.25 | 602 | 8.47 | 470 |
| | do | 0.17 | 7.97 | 397 | 7.63 | 535 | 7.77 | 702 | 8.02 | 604 | 8.33 | 612 |
| | do | 0.10 | 6.86 | 1,055 | 6.65 | 733 | 7.18 | 568 | 7.46 | 731 | 7.68 | 798 |
| Spores Direct | Lactose | 0.24 | 6.63 | 302 | 6.19 | 308 | 6.18 | 287 | 6.58 | 332 | 7.03 | 570 |
| | do | 0.17 | 6.71 | 339 | 6.26 | 301 | 6.69 | 333 | 7.01 | 400 | 7.28 | 082 |
| | do | 0.10 | 6.60 | 259 | 6.09 | 300 | 6.23 | 342 | 6.38 | 386 | 6.41 | 360 |
| | Glucose | 0.24 | 7.56 | 586 | 7.25 | 638 | 7.57 | 653 | 7.80 | 892 | 7.77 | 802 |
| | do | 0.17 | 7.39 | 764 | 7.05 | 730 | 7.51 | 572 | 7.73 | 602 | 7.73 | 725 |
| | do | 0.10 | 6.44 | 640 | 6.78 | 604 | 7.76 | 659 | 7.08 | 596 | | |
| | Sucrose | 0.24 | 7.37 | 376 | 7.53 | 642 | 7.74 | 589 | 8.05 | 823 | | |
| | do | 0.17 | 7.59 | 495 | 7.35 | 598 | 7.52 | 777 | 7.83 | 720 | 8.08 | 930 |
| | do | 0.10 | 7.01 | 496 | 6.61 | 472 | 6.65 | 372 | 6.99 | 456 | 7.06 | 532 |
| | Starch | 0.24 | 7.51 | 561 | 7.33 | 570 | 7.55 | 612 | 7.83 | 618 | 8.11 | 602 |
| | do | 0.17 | 7.40 | 578 | 7.01 | 443 | 7.61 | 574 | 8.01 | 575 | 8.27 | 573 |
| | do | 0.10 | 7.20 | 303 | 6.31 | 238 | 7.39 | 471 | 7.47 | 381 | 7.57 | 475 |
| Veg. Inoc. | Lactose (Chalk) | 0.17 | 6.72 | 698 | 6.87 | 855 | 6.29 | 884 | 6.65 | 800 | 6.16 | 1,016 |

The media employed to carry out the fermentations whose results are tabulated above were as follows:

C. S. L. solids to give 0.1%, 0.17% or 0.24% N. Lactose, glucose, sucrose or starch, 7% $KH_2PO_4$, 0.4% KCl, 0.1% limestone (or in one case precipitated chalk), 0.8%.

The following factors are also important in the successful practice of the invention to obtain the best results:

(a) As stated above it is preferred that the source of carbon and energy should be a carbohydrate. The carbohydrate level should be preferably be rather higher than might be expected. The level of carbohydrate can be as low as 3.5%, or even lower, but we prefer that it should be above 5%. The upper limit is not critical, but will not normally exceed about 12%. Where the carbohydrate is supplied in impure form, e. g. as molasses, it will of course be understood that these percentages refer to the carbohydrate content of the final medium, and will require correspondingly higher percentage additions of the impure carbohydrate-containing material. As stated above, sources of carbohydrate conventionally used in fermentation procedures are all available for use in the present process, including glucose, brown sugar and starch, but at present we prefer to use lactose. We find however, that the beneficial effect of lactose only becomes apparent when a vegetative inoculum is used, as can also be seen qualitatively from the above Table A.

The beneficial results to be obtained from high levels of carbohydrate can be seen quantitatively from the following Table B.

TABLE B

| Source and Quantity of Carbohydrate | 7 days | | 8 days | | 9 days | | 10 days | | 11 days | | 12 days | |
|---|---|---|---|---|---|---|---|---|---|---|---|---|
| | pH | Assay | pH | Assay | pH | Assay | pH | Assay | pH | Assay | pH | Assay |
| 7% Lactose | 6.11 | 552 | 6.13 | 734 | 6.91 | 1,300 | 6.41 | 1,352 | 6.60 | 1,135 | | |
| 3.5% Lactose | 6.74 | 510 | 6.84 | 636 | 6.51 | 772 | 6.65 | 604 | 7.28 | 534 | 7.79 | 600 |
| 7% Glucose | 7.07 | 613 | 7.02 | 775 | 7.85 | 778 | 7.45 | 754 | 7.64 | 837 | 7.85 | 862 |
| 3.5% Glucose | 7.89 | 473 | 7.91 | 471 | 8.47 | 500 | 8.43 | 470 | 8.40 | 514 | 8.71 | 498 |
| 7% Sucrose | 7.37 | 625 | 7.53 | 555 | 8.15 | 583 | 7.85 | 544 | 7.87 | 634 | 7.83 | 675 |
| 3.5% Sucrose | 8.10 | 388 | 8.08 | 448 | 8.68 | 432 | 8.56 | 409 | 8.52 | 491 | 8.79 | 467 |
| 7% Starch | 7.08 | 503 | 7.59 | 684 | 7.92 | 606 | 7.57 | 813 | 7.62 | 826 | 8.09 | 917 |
| 3.5% Starch | 7.98 | 272 | 8.27 | 302 | 8.64 | 298 | 8.53 | 285 | 8.45 | 310 | 8.71 | 294 |

In the above table the results were obtained using a vegetative inoculum in the following media:

C. S. L. solids to give 0.17% N
Lactose, glucose, sucrose and starch, 7% or 3.5%
$KH_2PO_4$, 0.4%
KCl, 0.1%
Limestone, 0.8%

(b) the pH of the medium is not critical, but should preferably be adjusted to between 4.5 and 5.5 before the fermentation commences. During the course of the fermentation the pH rises, and when complete is frequently of the order of 6.5 to 8. Griseofulvin itself is stable within the pH range of from 3.0 to 8.8. In order to make any necessary initial adjustment of the pH, and in order to buffer the fermentation, we have found it advantageous to add to the medium between 0.4 and 1.2% of phosphate and limestone or chalk. It is at present preferred to employ 0.4% to 0.8% of $KH_2PO_4$ and 0.8% of limestone. It may be noted that these substances also act as nutrient salts and that the phosphate in particular has a very beneficial effect on the yield of griseofulvin. The presence of limestone greatly diminishes pigmentation of the broth. In order to illustrate the effects of phosphate and of limestone we now give the following two Tables C and D.

TABLE C
*pH of medium and level of limestone in lactose-C. S. L. medium*

| Treatments | | 6 days | | 8 days | | 11 days | |
|---|---|---|---|---|---|---|---|
| Limestone Level, percent | Phosphate Level, percent | pH | Assay | pH | Assay | pH | Assay |
| Nil | Nil | 6.20 | 197 | 6.32 | 362 | 7.20 | 452 |
| Nil | Nil | 6.06 | 180 | 6.20 | 300 | 6.97 | 326 |
| Nil | 0.4 | 5.84 | 248 | 6.03 | 289 | 6.84 | 655 |
| Nil | 0.4 | 5.84 | 325 | 6.00 | 250 | 6.73 | 624 |
| Nil | 0.8 | 5.84 | 270 | 6.07 | 380 | 6.64 | 515 |
| Nil | 0.8 | 5.84 | 280 | 6.00 | 442 | ---- | ---- |
| 0.4 | Nil | 6.63 | 139 | 6.74 | ---- | 7.47 | 423 |
| 0.4 | Nil | 7.27 | 165 | 6.75 | 250 | 7.38 | 410 |
| 0.4 | 0.4 | 6.54 | 227 | 6.75 | 340 | 7.71 | 568 |
| 0.4 | 0.4 | 6.51 | 248 | 6.59 | 370 | 7.71 | 652 |
| 0.4 | 0.8 | 6.42 | 229 | 6.73 | 325 | 7.43 | 830 |
| 0.4 | 0.8 | 6.49 | 227 | 6.81 | 325 | 7.58 | 798 |
| 0.8 | Nil | 6.70 | 133 | 6.82 | 152 | 7.93 | 304 |
| 0.8 | Nil | 6.89 | 133 | 7.12 | 200 | 8.08 | 312 |
| 0.8 | 0.4 | 6.63 | 257 | 6.68 | 315 | 7.45 | 532 |
| 0.8 | 0.4 | 6.62 | 253 | 6.58 | 312 | 7.48 | 631 |
| 0.8 | 0.8 | 6.61 | 248 | 6.81 | 315 | 7.59 | 672 |
| 0.8 | 0.8 | 6.60 | 253 | 6.68 | 289 | 7.43 | 684 |
| 1.2 | Nil | 6.78 | 152 | 7.03 | 252 | 7.97 | 307 |
| 1.2 | Nil | 6.93 | 148 | 7.31 | 277 | 7.99 | 381 |
| 1.2 | 0.4 | 6.55 | 270 | 6.85 | 320 | ---- | 516 |
| 1.2 | 0.4 | 6.52 | 293 | 6.67 | 350 | 7.37 | 521 |
| 1.2 | 0.8 | 6.61 | 238 | 6.76 | 292 | 7.37 | 611 |
| 1.2 | 0.8 | 6.60 | 227 | 6.65 | 334 | 7.27 | 582 |

These results were obtained using the lactose-C. S. L. medium we described below, and from them it will be seen that where the carbohydrate source is lactose the titres respond very favourably to the presence of phosphate, but only slightly to limestone. However, undesirable brown pigmentation occurred in the absence of the latter. The next table shows that using an otherwise similar medium, in which, however, glucose replaced lactose, and with two different sources of phosphate at a level of 0.4% in each case, the beneficial effects of limestone on the titre are much more marked. Here again the presence of limestone also reduced pigmentation.

TABLE D
*pH of medium and level of limestone in glucose-C. S. L. medium*

| Treatments | | 6 Days | | 8 Days | | 9 Days | |
|---|---|---|---|---|---|---|---|
| Limestone Level | Phosphate | pH | Assay | pH | Assay | pH | Assay |
| Nil | $KH_2PO_4$ | 6.05 | 475 | 6.76 | 535 | 7.11 | 570 |
| Nil | $KH_2PO_4$ | 6.18 | 518 | 6.85 | 525 | 7.11 | 448 |
| 0.4% | $KH_2PO_4$ | 6.38 | 448 | 7.40 | 608 | 8.80 | 400 |
| 0.4% | $KH_2PO_4$ | 6.36 | 485 | 8.39 | 626 | 8.06 | 620 |
| 0.8% | $KH_2PO_4$ | 6.85 | 473 | 7.44 | 740 | 8.88 | 633 |
| 0.8% | $KH_2PO_4$ | 6.85 | 450 | 7.45 | 672 | 8.97 | 550 |
| 1.2% | $KH_2PO_4$ | 6.88 | 525 | 7.30 | 584 | 8.13 | 592 |
| 1.2% | $KH_2PO_4$ | 6.84 | 535 | 7.41 | 760 | 8.02 | 522 |
| Nil | $K_2HPO_4$ | 6.42 | 480 | 7.24 | 670 | 7.83 | 512 |
| Nil | $K_2HPO_4$ | 6.40 | 450 | 7.27 | 658 | 7.83 | 510 |
| 0.4% | $K_2HPO_4$ | 6.85 | 608 | 7.56 | 678 | 7.95 | 648 |
| 0.4% | $K_2HPO_4$ | 6.94 | 606 | 7.51 | 708 | 8.08 | 681 |
| 0.8% | $K_2HPO_4$ | 7.28 | 625 | 7.50 | 735 | 8.07 | 634 |
| 0.8% | $K_2HPO_4$ | 7.36 | 612 | ---- | ---- | 9.06 | 548 |
| 1.2% | $K_2HPO_4$ | 7.21 | 602 | 7.58 | 740 | 9.13 | 736 |
| 1.2% | $K_2HPO_4$ | 6.94 | 545 | ---- | ---- | 9.13 | 623 |

(c) The degree of aeration should be good. It appears in general that, within limits, the greater the aeration the higher will be the yield of griseofulvin, and this is particularly the case the higher the level of nitrogen in the medium. It is however impossible to quote precise values for the aeration, for as is well known the degree of aeration depends not only on the actual rate of air supply but also on the efficiency with which it is used, which in turn depends on many other variables too numerous to detail, including the size and shape of the fermentation vessels and the manner in which the air is introduced.

The effect of increased aeration is illustrated in the following Table E, in which results are given for a series of fermentations carried out employing media in which the nitrogen level was in each case 0.15% but in which the carbohydrate sources varied. Volumes of 40 mls., 60 mls. and 80 mls. respectively of broth were in every case shaken in 250 ml. flasks. It will be understood that the lower the broth volume the greater was the aeration. Except as regards the carbohydrate source the medium employed in each case was similar to the C. S. L.-lactose medium we described below, inoculated with 1 ml., 1.5 mls. and 2 mls. respectively of a submerged spore suspension.

TABLE E

| Treatments | | 6 days | | 7 days | | 8 days | |
|---|---|---|---|---|---|---|---|
| Carbohydrate | Broth Volume, milliliters | pH | Assay | pH | Assay | pH | Assay |
| Lactose | 40 | 6.47 | 255 | 6.41 | 300 | ---- | 318 |
| | 40 | 6.47 | 137 | 6.41 | 256 | ---- | ---- |
| | 60 | 6.34 | 140 | 6.12 | ---- | 6.33 | 110 |
| | 60 | 6.56 | 218 | 6.18 | ---- | 6.33 | 380 |
| | 80 | 6.67 | 187 | 6.56 | 270 | 6.41 | 208 |
| | 80 | 7.03 | 158 | 6.41 | 218 | 6.47 | 205 |
| Brown Sugar | 40 | 7.74 | 475 | 7.81 | 652 | 8.08 | 655 |
| | 40 | 7.74 | 443 | 7.81 | 500 | 8.08 | 655 |
| | 60 | 7.75 | 441 | 7.57 | 515 | 7.59 | 606 |
| | 60 | 7.61 | 395 | 7.74 | 505 | 7.84 | 593 |
| | 80 | 7.63 | 505 | 7.24 | 537 | 7.73 | 500 |
| | 80 | 7.64 | 386 | 7.34 | 430 | 7.62 | 453 |
| Glucose | 40 | 7.47 | 585 | 7.57 | 675 | ---- | 932 |
| | 40 | 7.47 | 554 | 7.57 | 727 | ---- | ---- |
| | 60 | 7.52 | 562 | 7.50 | 615 | 7.70 | 708 |
| | 60 | 7.52 | 546 | ---- | ---- | ---- | ---- |
| | 80 | 6.68 | 418 | 7.05 | 573 | 7.57 | 650 |
| | 80 | 6.35 | 368 | 7.12 | 537 | ---- | ---- |

(d) The medium must contain a proportion of available chlorine in order to avoid formation of dechloro griseofulvin. Provided that sufficient chlorine is present, the level does not appear to be critical. If complex organic materials are used as the nitrogen source, these usually contain some proportion of chlorine. We have however found that it is usually convenient to ensure satisfactory results by making additions of between 0.05 and 0.25% of a suitable soluble chloride and we prefer at present to employ approximately 0.1% of KCl.

(e) The inoculum employed can be either a spore suspension or a freely-growing vegetative inoculum, but the latter is to be preferred. Where a spore suspension is used to inoculate a 150 litre seed-stage vessel we have found it satisfactory to employ 150 mls. of suspension having a count of approximately $18 \times 10^6$ spores per ml. When well-grown this vegetative inoculum is used at a level between 1 and 10% for inoculation of the fermentation medium.

We now give, by way of illustration only, three examples of media which have proved satisfactory for the production stage of the process.

(a) Medium for submerged fermentation (I):
    C. S. L. solids _____ 2.85% (=0.15% N).
    Lactose _____ 7.0%.
    KCl _____ 0.1%.
    $KH_2PO_4$ _____ 0.4%.
    Limestone _____ 0.8%.
    Natural pH (b) Medium for submerged fermentation (II):
    Whey _____ 5.738%=3.5% lactose, 0.1% nitrogen.
    Lactose _____ 3.5%.
    $KH_2PO_4$ _____ 0.4%.
    KCl _____ 0.1%.
    C. S. L. solids _____ 0.38% (giving approx. 0.035% N).
    Natural pH (c) Medium for submerged fermentation (III):
    C. S. L. solids _____ 2.85% (=0.15% N).
    Starch _____ 7.0%.
    KCl _____ 0.1%.
    $KH_2PO_4$ _____ 0.4%.
    Limestone _____ 0.8%.
    Natural pH The temperature at which the fermentation is effected is not apparently critical, but we at present prefer to employ a temperature of approximately 25° C. It is also often desirable to add an antifoam agent to the fermentation, such as white mineral oil, conveniently in an amount in the medium of from 0.25 to 0.75%.

It has been found that in order to bring about sporulation of the griseofulvin-producing mould for the purpose of preparing a spore suspension suitable for use as an inoculum, either for a development or production stage, particularly in the case of the preferred strain *Penicillium patulum* Bainier-Thom, it is not in general satisfactory to employ the normal production medium. We have however found that spore suspensions can be produced in a submerged medium provided certain requirements are met. In particular it is desirable that the total available nitrogen level of the media used for the production of spore suspensions should be below 0.25%, and preferably lie between 0.05 and 0.1%, and also that good aeration should be maintained, the latter factor being perhaps the more important. The optimum values of these factors vary slightly from strain to strain of the organism.

We have found that there is a marked interaction between the nitrogen level and the aeration which is necessary, the lower the aeration the lower being the level of nitrogen that is required. As an illustration, we have found that 600 mls. of a medium in which whey is used as the nitrogen source to give a nitrogen level of about 0.05%, and which includes suitable proportions of lactose, phosphate, chloride and corn steep liquor, when strongly shaken in a 2 litre flask at 25° C. for six days gave prolific sporulation. We will now give, by way of illustration, an example of a medium that has been found suitable for the sporulation stage of the process.

Medium for submerged sporulation of *P. patulum* Bainier Thom (IV):

Whey powder approx. 2.84% to give 0.05% N, 1.725% lactose.
Lactose _____ 1.775%.
$KH_2PO_4$ _____ 0.4%.
KCl _____ 0.05%.
C. S. L. solids _____ 0.38% to give approx. 0.04% N.
Natural pH As previously mentioned, the spore suspension obtained from the sporulation stage can either be used for direct inoculation of the fermentation stage proper, or it can be subjected to development in any suitable medium to yield a vegetative inoculum for the fermentation stage. This latter course is at present preferred, particularly where the carbohydrate source in the fermentation stage is to be lactose; where glucose is used in the fermentation stage the advantage derived from a vegetative inoculum is not so apparent. The conditions governing the development stage of the process are in general not unlike those in the final fermentation stage, and we have found that satisfactory results can be obtained with various development media, including either of the media I or II described above for the fermentation stage of the process.

We have found that griseofulvin produced by the fermentation remains to a major extent, e. g. 90%, in the mycelium itself rather than passing into the broth, unless the fermentation is allowed to proceed too far, in which case the mycelium breaks down and the griseofulvin may become distributed throughout the broth. The extraction of griseofulvin from the broth itself present difficulties. We therefore prefer to take advantage of the retention of the griseofulvin in the mycelium, and to stop the fermentation before break-down of the mycelium occurs to any substantial extent.

The extraction of the antibiotic can be carried out in any convenient manner. Methods for performing this extraction have been previously proposed for surface cultures, and in general such methods are suitable for use in the process of this invention.

We now give by way of example a general description of our preferred methods of extraction.

The mycelium is separated from the broth, preferably by filtration at a pH which should be lower than 8.0. The filtrate, which contains approximately 10% of the griseofulvin produced, is generally then discarded, although if desired the antibiotic may be recovered therefrom by separate extraction techniques. The mycelial solid is extracted with an organic solvent, for example, ethyl acetate, n-butanol, amyl acetate or preferably butyl acetate. The extraction is conveniently carried out by mixing the mycelium and solvent together, preferably at an equal weight/volume, for a period of approximately 15 minutes, and then separating them by sedimentation and decantation. This extraction procedure should preferably be repeated two or more times. The decanted solution is then preferably clarified by centrifugation or by filtration, and concentrated, preferably under vacuum so that the temperature does not exceed 50° C. The concentration is carried out to the fullest extent practicable, and the concentrate is then allowed to cool to 20° C. or thereabouts, and the solid filtered off. If, as is commonly the case, some oily liquid has been extracted from the mycelium at the same time as the griseofulvin, any oil adhering to the solid is washed off by mixing it with some suitable solvent, for example butyl acetate, in equal weight/volume ratio and re-filtering. The washed solid is dried, preferably under vacuum, for example over phosphorous pentoxide at room temperature. The crude griseofulvin thus obtained may be purified by dissolving it in an organic solvent such as acetone, filtering, and precipitation by the addition of water, in which griseofulvin is not soluble to any extent. This procedure can if necessary be repeated, and the product is then dried yielding pure crystalline griseofulvin.

In order that the invention may be well understood, we shall now give, by way of illustration only, an example of a small scale production process for griseofulvin:

*Preparation of spore suspension.*—600 mls. of the following medium were autoclaved in a 2-litre conical flask:

| | |
|---|---|
| Whey powder, to give | Lactose 3.5%, nitrogen 5.05%. |
| $KH_2PO_4$ | 0.4%. |
| KCl | 0.05%. |
| C. S. L. solids | 0.38% (to give approx. 0.04% N). |

The flask was inoculated with a suspension of spores from a well-sporulated Czapek-Dox agar culture of *Penicillium patulum* Bainer Thom (4640, 455) C. M. I. 39, 809, and incubated on a shaker at 25° C. for seven days. By this time the culture had produced abundant submerged spores.

*Vegetative seed-stage.*—150 litres of the following medium, contained in a stirred fermenter, were inoculated with 150 mls. of the suspension of submerged spores containing approximately $18 \times 10^6$ spores/ml.:

| | |
|---|---|
| Whey powder, Lactose to give | Lactose 3.5%, nitrogen 0.11%. |
| $KH_2PO_4$ | 0.4%. |
| KCl | 0.1%. |
| C. S. L. solids | 0.38% (to give approxi. 0.04% N). |

No pH adjustment. Sterilised 20 mins. at 120° C.

The air-flow was about 3 cubic feet per minute (C. F./m.) for the first twenty-four hours and was then increased gradually to 8 C. F./M. as growth developed and foaming subsided. The temperature was 25° C. with stirring at 350 revolutions per minute (R. P. M.). The seed-stage was transferred to the fermentation medium at 28 hours.

*Fermentation stage.*—450 litres of the following medium were used:

| | Percent |
|---|---|
| C. S. L. solids, to give nitrogen | 0.2 |
| Lactose | 7 |
| Limestone | 0.8 |
| $KH_2PO_4$ | 0.4 |
| KCl | 0.1 |

No pH adjustment. Sterilised 20 mins. at 120° C.

The fermentation medium was inoculated with 10% vegetative inoculum from the seed-stage fermenter.

Air-flow was maintained as near to 10 C. F./M. as possible for the first eight hours, and was thereafter approximately 20 C. F./M. The temperature was 25° C. and stirring rate was 350 R. P. M.

White mineral oil was used as antifoam as required.
Details of the fermentation were as follows:

| Log. hrs.: | Titre |
|---|---|
| 0 | – |
| 56 | – |
| 90 | 530 |
| 114 | 910 |
| 138 | 1355 |
| 162 | 1675 |

The batch on solvent extraction by the procedure previously described gave 150 gms. of 95% pure griseofulvin.

We claim:

1. In a process for the production of griseofulvin by culturing a griseofulvin-producing organism in a culture medium which will support the growth of said organism for the production of griseofulvin, the step of culturing said organism under submerged aerobic conditions in a medium including an assimilable source of nitrogen at a level of 0.04% to 0.30% of N, a source of carbon and energy, and nutrient salts.

2. A process as claimed in claim 1 wherein said medium contains from 0.075%–0.25% of available nitrogen.

3. A process as claimed in claim 2 in which the nitrogen source is in the form of complex organic materials.

4. A process as claimed in claim 3, wherein the complex organic material is selected from the group consisting of corn steep liquor, a milk product, cottonseed meal, oatmeal and soya bean meal.

5. A process as claimed in claim 2 in which the source of carbon and energy is a carbohydrate present in an amount of at least 3.5%.

6. A process as claimed in claim 5 wherein the carbohydrate is present in an amount of at least 5%.

7. A process as claimed in claim 5 wherein the carbohydrate is selected from the group consisting of lactose, glucose, sucrose and starch.

8. A process as claimed in claim 2 wherein the nutrient salts include phosphates.

9. A process as claimed in claim 8 wherein the phosphates are present in an amount of between 0.4% and 0.8%.

10. A process as claimed in claim 9 in which the phosphates are selected from the group consisting of $KH_2PO_4$ and $K_2HPO_4$.

11. A process as claimed in claim 2 wherein the medium includes chalk.

12. A process as claimed in claim 11 wherein said chalk is supplied in the form of limestone at a level of approximately 0.8%.

13. A process as claimed in claim 2 wherein said nutrient salts include chlorides.

14. A process as claimed in claim 13 wherein said chlorides are present in an amount of at least 0.1%.

15. A process as claimed in claim 14 wherein said chloride is potassium chloride.

16. A process as claimed in claim 2 in which the medium is inoculated with from 1–10% of a freely-growing vegetative inoculum of the organism.

17. In a process for the production of griseofulvin by culturing a griseofulvin-producing organism in a culture medium which will support the growth of said organism for the production of griseofulvin, the steps of inoculating a culture medium containing from 0.04% to 0.30% of available nitrogen, from 0.4–0.8% limestone, at least 3.5% of a carbohydrate and at least 0.1% of a soluble chloride with a freely-growing vegetative inoculum of said organism and culturing the same up under submerged aerobic conditions to the point of mycelial break-down, separating the mycelium from the broth, and solvent extracting the griseofulvin which is produced from the mycelium.

18. A process as claimed in claim 17 wherein said solvent is butyl acetate.

19. A process as claimed in claim 18 wherein the mycelium is separated from the broth by centrifugation, mixed with an approximately equal volume of butyl acetate for a period of approximately 15 minutes, the solution removed by decantation and concentrated at a temperature not exceeding 50° C., the concentrated solution cooled and the solid filtered off.

20. A process for the production of griseofulvin by submerged aerobic cultivation of a griseofulvin-producing organism, which comprises inoculating a medium containing between 0.04%–0.30% of available nitrogen, a source of carbon and energy, and nutrient salts, with a freely-growing vegetative inoculum derived from a griseofulvin-producing organism selected from the group consisting of *Penicillium patulum* Bainier Thom and mutants thereof, culturing the same at a temperature of approximately 25° C. under good aeration until the point of mycelial break-down, separating the mycelium from the cultured broth, extracting the griseofulvin thus produced from the mycelium with a solvent selected from the group consisting of butyl acetate, amyl acetate and ethyl acetate, concentrating said solution and isolating substantially pure griseofulvin therefrom.

21. A process, as claimed in claim 1, in which the nitrogen source is in the form of a complex organic material, the source of carbon and energy is a carbohydrate present in an amount of at least 3.5% and the nutrient salts include a phosphate.

No references cited.